Nov. 21, 1944.  R. J. ANSCHICKS  2,363,279

DUMP VALVE

Filed April 15, 1943

Inventor:
Rudolph J. Anschicks:
By: Hiie & Hiie  Attys.

Patented Nov. 21, 1944

2,363,279

UNITED STATES PATENT OFFICE 2,363,279

DUMP VALVE

Rudolph J. Anschicks, Chicago, Ill., assignor to Protectoseal Company of America, Inc., Chicago, Ill., a corporation of Illinois Application April 15, 1943, Serial No. 483,114

8 Claims. (Cl. 251—20)

My invention belongs to that general class of valves and relates particularly to a fluid valve for controlling the passage of fluid between communicating spaces, and more particularly to a valve comprising a helical spring which may be contracted to prevent the passage of fluid through the same or extended to permit its flow.

The invention has among its objects the production of a simple, compact, efficient, durable and inexpensive device of the kind described for use wherever found applicable.

A further object is the production of a valve which may be considered a type of valve with a plurality of seats, each coil of the spring constituting a valve part substantially operative as a separate valve, the whole comprising a long extended or elongated valve member with an elongated seat, which valve when open provides an extended space or opening between the coils for the passage of fluid.

Another object is the production of a valve of the kind described provided with means for positively controlling its opening and closing. The valve may be constructed with a spring or helical member under a tension normally tending to either expand the spring or to contract it, this depending on the style of spring used—that is to say, the tension may be such as to either normally expand the spring to open the valve which may be positively closed and maintained closed, or in the other design to contract the spring so that it is normally closed, there being means provided on the device for positively closing the valve or positively opening it, or to positively open and close it, as the case may be.

In the preferred embodiment of the invention the valve, that is the coils of the spring, are provided with suitable gaskets, affording a leak-proof construction, the gasket being disposed between contiguous coils and concentric therewith. The construction of the valve is such that the coils may be readily separated even though corroded, either by the tension of the spring, by interior pressure or by the direct application of force to the tension controlling means.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

Referring to the drawing, in which only two embodiments of the invention are shown:

Figure 1:
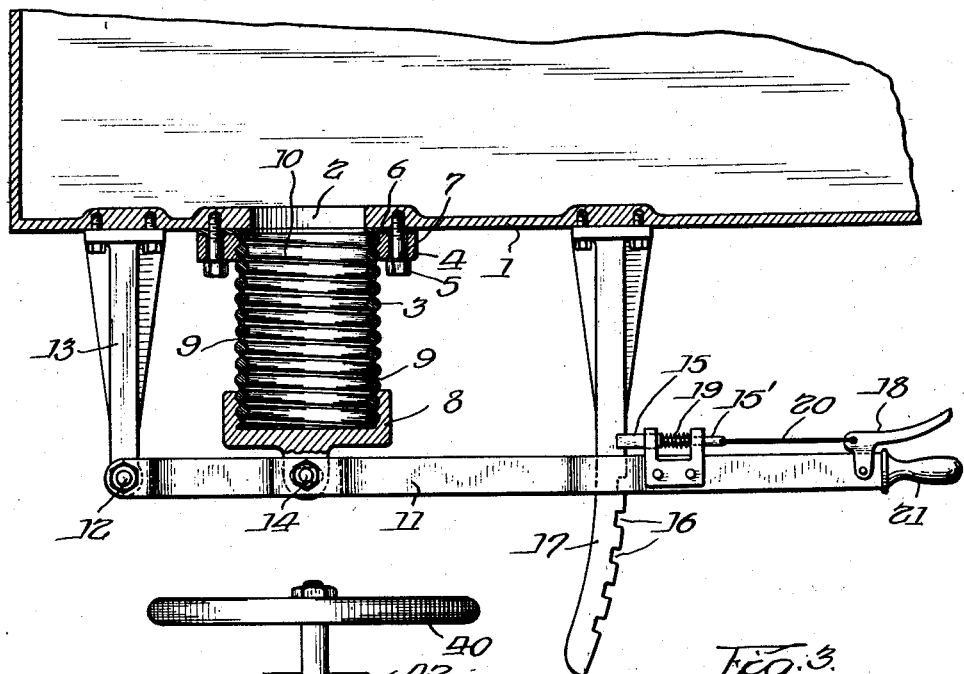
Fig. 1 is a view partly in section and partly in elevation of a valve which is in the nature of a dump valve.
Figure 3:
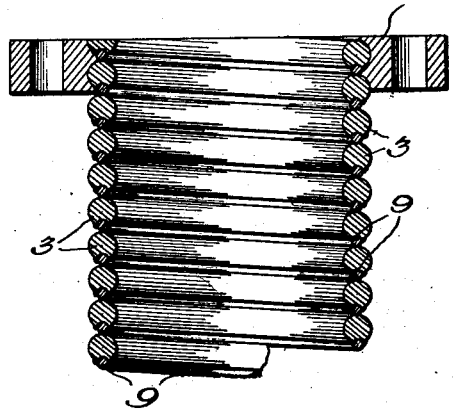
Fig. 3 is a sectional view through the spring or helical member illustrating one method of applying a gasket between contiguous coils.

Referring first to Figs. 1 and 3, I represents a container or tank, for example a tank on an airplane, which it may be desired in an emergency to empty in a minimum of time by dumping the contents, the same being provided with a discharge port or opening 2. Arranged at the opening and suitably supported, as shown secured to the tank I, is a valve, consisting of coiled spring 3 comprising a length of solid coiled wire of the desired size and of the desired tension, the same being carried by a member 4 secured to the tank by bolts or studs 5 or in an equivalent manner. As shown, a gasket 6 may be arranged between the member 4 and the tank I and if desired also a gasket 7 between the heads of the studs 5 and the member 4. The opposite end of the spring 3 is closed by a cap 8 secured thereto sealing the end of the spring.

In the preferred construction between the contiguous coils 3 is arranged a gasket 9 (see Fig. 3) which forms an effective seal between the coils 3 when the spring is closed or contracted, sealing the interior chamber 10 in the spring and preventing leakage between the coils. Any other suitable type of gasket may be employed, that shown being concentric with the coils and seated in a continuous groove in one face thereof adjacent a contiguous coil for which it forms a seat. In this particular construction it is generally preferred to have the spring under tension, tending to normally maintain the coils in close contact seated on the gaskets. To open the valve any suitable means may be provided to positively separate the coils, a simple construction consisting of lever 11 pivoted at 12 to a bracket 13 and at 14 to the cap 8. To prevent the valve opening under the weight of the contents of the tank which might be sufficient to overcome the tension of the spring, suitable means is provided for locking the lever 11, that shown consisting of a detent 15 engaging in notches 16 in the bracket 17. The detent 15 is controlled by a hand operated grip 18 secured by a link 20 to the extended end 15' of the detent 15, a spring 19 tending to normally maintain the detent in locking position. As shown, the grip 18 is arranged adjacent the handle 21 of the lever 11 so that in the event it is desired to dump the contents of the tank quickly in an emergency, the lever 11 may be unlocked and pulled down to forcibly extend the spring. The locking means shown for illustrative purposes is of a conventional design and is part of the combination to disclose some form of lock which in itself forms no part of the present invention. It may be modified as required or desired.

Figure 2:
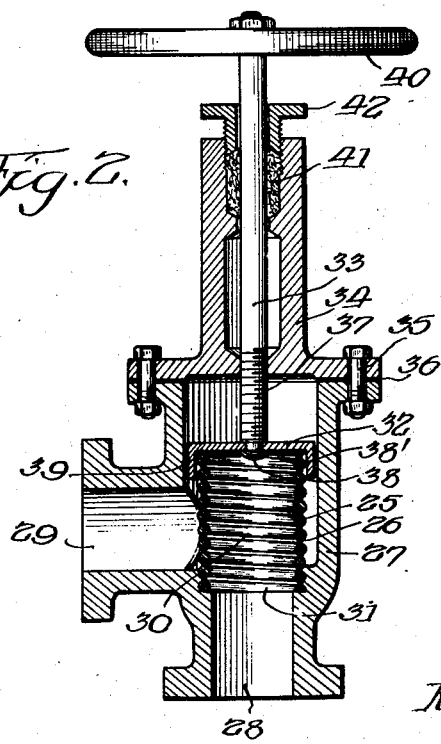
Fig. 2 is a sectional view of another form of valve of the type ordinarily used for controlling the passage of fluid from one conduit to another.

In the valve construction shown in Fig. 2, 25 represents a spring or helical member between the coils of which may be arranged the gasket 26, providing seats for the coils. The spring or valve is arranged in the housing 27 provided with ports 28 and 29 for the admission and discharge or passage of fluid through the housing, the same communicating with the interior or chamber 30 of the spring when the valve is opened. In this particular construction the end coil 31 of the spring is secured to the housing, that is, as shown anchored therein adjacent the port 28, and at the upper end is arranged a cap or closure 32 which is secured to a rod or valve stem 33 extending through the bonnet 34. The bonnet may be secured in place by bolts 35 or in an equivalent manner, with the gasket 36 between the housing 27 and the bonnet 34. In this embodiment of the invention the rod or stem 33 is secured at 38 to the cap 32 so that the cap may be moved by turning the stem, which cap is shown provided with a flange 39 forming a recess or seat in which the end of the spring is seated, as well as a guide for the cap and the spring when the cap is moved from or toward the port 28. A gasket 38' may be positioned in the cap as shown to prevent leakage at the end of the spring which is seated in the cap. The stem 33 may be operated by a hand wheel 40 or the equivalent, leakage along the stem being prevented by the conventional packing 41 and the gland nut 42 or their equivalents. As illustrated, the spring in this embodiment is shown compressed or contracted so that the coils and gasket are firmly seated and leakage between or around the coils prevented. The valve is therefore closed. If it is desired to open the valve the stem 33 is turned or screwed outwardly to the desired extent, the tension of the contracted spring expanding the same as the cap 32 is moved toward the bonnet 34, permitting the coils to separate and fluid to pass between the same. Obviously, the upper end of the spring or end seated in the cap 32 may be permanently secured thereto, so that in that instance the spring may be both positively contracted or extended as desired. It is obvious that if the spring is such that its internal tension tends to normally maintain the same contracted or the coils closed the same results may be obtained if the spring and cap are secured together, so that the spring may be forcibly extended.

In either construction it will be noted that there is provided a valve having an elongated or extended engagement with the gasket upon which it is seated and the full valve opening may be quickly attained or the valve as quickly closed. Owing to the helical valve construction, in the event of any corrosion, it will be obvious that should the valve stick at any point or points throughout its length it can tear apart at the easiest tearing point and having started to tear apart between the coils be readily stripped from corroded engagement throughout the length of the associated coils.

Obviously any suitable means may be employed to limit the relative coil movements when the spring is extended so that in extending the spring it is not distorted but opens uniformly or substantially so. This feature is not illustrated since it is disclosed in a copending application.

Having thus described my invention, it is obvious that various immaterial and obvious modifications of details may be made in the same by one skilled in the art without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A valve for controlling the passage of fluid between communicating spaces consisting of a coiled spring of tubular construction and comprising a length of solid coiled wire, and a gasket member seated in a continuous groove in the length of coiled wire and adapted to seat upon adjacent coils thereof, said coiled spring and gasket providing a chamber, means in one space for securing the coiled spring to a cooperating part with the chamber in communication with the other space and supplemental means for positively controlling the expansion and contraction of the spring to permit or prevent the passage of fluid between the coils from one space to the other.

2. A valve of the kind described for controlling the passage of fluid between communicating spaces consisting of a coiled spring of tubular construction comprising a length of solid coiled wire and a gasket member seated in a continuous groove in the coiled wire and adapted to seat upon adjacent coils thereof, said coiled spring and gasket being arranged in one space and providing a chamber, means for securing the coiled spring to a cooperating supporting part with the chamber in communication with another space and supplemental means in the first space for positively controlling the expansion and contraction of the spring to permit or prevent the passage of fluid between the spaces.

3. In a valve of the kind described and in combination, a coiled spring of tubular construction comprising a length of solid coiled wire provided with a chamber within the coils, means for securing the coiled spring to a cooperating part, a gasket member seated in a continuous groove in the coiled spring and seating upon adjacent coils thereof, and supplemental means for extending or contracting the spring as desired.

4. In a dump valve of the kind described and in combination, a container, a coiled spring of tubular construction and comprising a length of solid coiled wire, said coiled spring being provided with a chamber within the coils, means for securing the same to the container with the said chamber communicating with the interior of the container, a continuous gasket member seated in a continuous groove in one face of the coils and adapted to seat upon adjacent coils, and supplemental means for extending or contracting the spring as desired.

5. In a device of the kind described and in combination, a coiled spring constituting a valve of tubular construction and providing a chamber within the same, means for maintaining the spring in cooperative relation with an enclosed space with the chamber at the interior of the spring communicating with the space, a coiled gasket seated in a continuous groove in one face of the coils and adapted to seat upon adjacent coils and concentric with the coils of the spring, and means for controlling the spring tension and relative movements of the coils to permit or prevent the opening of the spaces between the spring coils.

6. In a device of the kind described and in combination, a coiled spring comprising a length of solid coiled wire and constituting a valve of tubular construction and providing a chamber within the same, means for maintaining the spring in cooperative relation to an enclosed space with the chamber at the interior of the spring communicating with the space, a coiled gasket seated in a continuous groove in one face of the coils and arranged between and concentric with the coils of the spring, and means at the exterior of said enclosed space for controlling the spring tension to permit or prevent the opening of the spaces between the spring coils, and means for locking said controlling means and preventing actuation thereof.

7. In a fluid control device of the kind described and in combination, a housing provided with an inlet and an outlet and a valve for controlling the passage of fluid through the housing, said valve consisting of a spring having a plurality of coils providing openings between the coils when the spring is extended, and means for controlling the spring tension to control the passage of fluid between the said coils, and means for preventing leakage of fluid between the coils when the spring is contracted comprising a helical gasket member seated in a continuous groove in one face of the coils and adapted to seat upon adjacent coils.

8. In a device of the kind described and in combination, a housing provided with a chamber having an inlet and an outlet port, a spring constituting a valve arranged within said chamber, said spring consisting of a plurality of helically arranged coils with a gasket seated in a continuous groove in one face of the coils and adapted to seat upon adjacent coils, means extending to the exterior of the housing for controlling the extension or contraction of the spring and to vary the distances between the coils to thereby control the passage of fluid in the housing between said ports.

RUDOLPH J. ANSCHICKS.